United States Patent Office 2,770,098
Patented Nov. 13, 1956

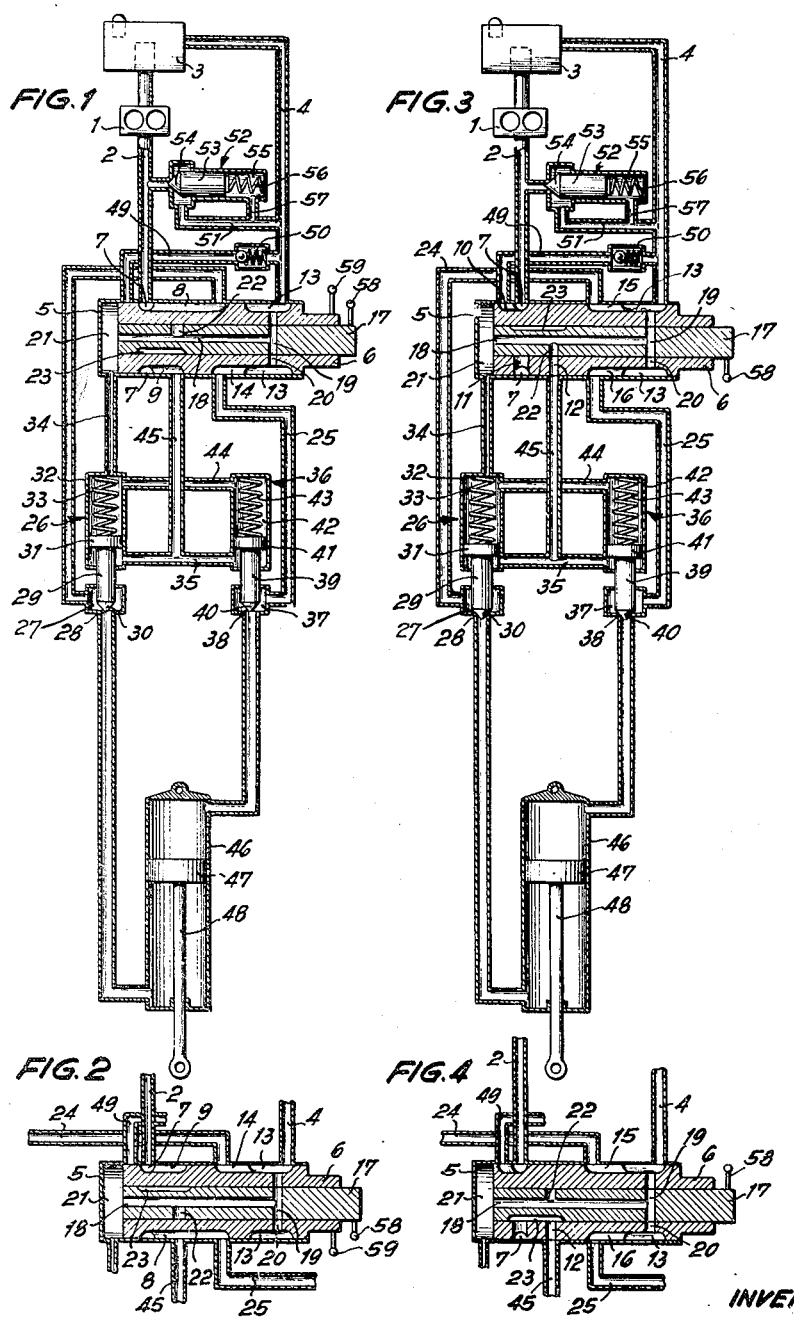

2,770,098

HYDRAULIC SERVO-MOTORS

Eberhard Korkowski, Stuttgart-Feuerbach, and Gustav Schmidt, Stuttgart-Vaihingen, Germany, assignors to Robert Bosch G. m. b. H., Stuttgart, Germany Application February 26, 1953, Serial No. 339,061

Claims priority, application Germany March 12, 1952

11 Claims. (Cl. 60—52)

This invention relates to improvements in control members for hydraulic servo-motors as for instance used in hydraulic jacking devices. These servo-motor devices have a particular scope of utility in the working of appliances attached to automobile tractors, in which a pump is connected by means of a suction and a pressure pipe each having a control, the latter being connected by means of two working pipes with a working cylinder through pressure-operated stop valves.

An object of this invention is to provide a more efficient reliable and adaptable hydraulic servo-motor control means which will allow the raising or lowering of the working appliance by a simple manipulation, to allow the pump of the motor to work with the absorption of the minimum of power when running with no load and which also enables the working appliance to be held in a predetermined fixed position, or to allow for its release, for any desired motion.

A further object is to allow the working appliance to be adjusted without respect to the position of the means used for the control, when the pump is not in operation.

According to the present invention, the stop valves of a control device are connected by means of a control conduit means with two control members in such a way that in one operative position the first control member connects the pressure conduit means with a working conduit means and a control conduit means; in a second operative position, however, the pressure conduit means is connected to the second working conduit means and to the control conduit means, whilst the other actual working conduit means is connected with the suction conduit means and the second control member is without effect and further that in the position of rest the first control member connects together the pressure and suction conduit means through a by-pass and the working conduit means while the second control member connects the control conduit means either to the pressure conduit means or to the suction conduit means.

The invention is further described with reference to the accompanying drawing, showing one arrangement by way of example.

In the drawings:

Fig. 1 is a diagram of the hydraulic drive in the operative position,

Fig. 2 shows the control members at another point of the operative position,

Fig. 3 shows a hydraulic drive in the position of rest and

Fig. 4 shows the control members at another point of the position of rest.

A pressure pipe 2 is connected to a pump 1, and also to a suction pipe 4 through a tank 3. These two pipes lead to the casing of a rotary valve 6.

This rotary valve has at the point where the pressure pipe 2 connects with it an annular groove 7 from which two grooves 8 and 9 branch off which are disposed in the sleeve of the valve opposite each other. The groove 8 is longer than the groove 9. In addition a longitudinal groove 10 (Fig. 3) and a bore 11 leading inwards start from the said annular groove in an axial plane perpendicular to the plane of the grooves 8 and 9. Parallel to this bore and in the same radial plane as the end of the groove 9, there is also disposed, the rotary valve 6 which has another bore 12 (Fig. 3).

A second annular groove 13 is provided on the rotary valve 6 in such a way that it connects with the suction pipe 4. From this annular groove starts a longitudinal groove 14, which is coaxial with the groove 9, and two longitudinal grooves 15 and 16 (Fig. 3) in the axial plane vertical to the plane of these grooves 9 and 14 and which are as long as the longitudinal groove 14.

In the rotary valve 6, a rotary valve 17 is coaxially mounted. It contains a longitudinal bore 18 which is connected in all the positions of the rotary valve by means of a transverse bore 19 and by bores 20 in the rotary valve 6, with the annular groove 13. This longitudinal bore connects with the frontal space 21 of the casing 5 in which the leakage fluid flowing from the rotary valves to the inside, collects. From the longitudinal bore 18 a radial bore 22 branches off, which lies in the radial plane of the bore 12. On the opposite side a longitudinal groove 23 is disposed in the rotary valve 17 and which extends between the radial planes of the bores 11 and 12.

Between the pressure and the suction pipe a working pipe 24 starts from the casing 5 so that it is disposed in the region of the grooves 8, 14 and 15. From the opposite point extends a further working pipe 25.

The working pipe 24 leads through a valve 26 to a working cylinder. This valve consists of a valve chamber 27 containing a valve seat 28, of a locking member 29 with a conical end 30, of a piston 31, and also of a cylinder 32 receiving this piston and which also encloses a closing spring 33. The upper part of the cylinder 32 is connected by means of oil leakage pipe 34 with the frontal space 21 of the casing 5, a transverse pipe 35 connects with the lower part of the cylinder. A similarly constructed valve 36 is inserted into the working pipe 35. It consists of a valve chamber 37 with valve seat 38, stop member 39 with a conical end 40, a piston 41, and cylinder 42, and a pressure spring 43. The upper part of the cylinder 42 is connected by means of an oil leakage pipe 44 with the same part of the cylinder 32, while its lower part is connected with the transverse pipe 35. From this transverse pipe a control pipe 45 leads to the casing 5 and connects there in the region of the groove 9 and bore 12.

The working cylinder 46 contains a piston 47 with a piston rod 48 to which the non-illustrated working device is connected. From the casing 5 a pipe 49, beginning in the region of the groove 10, leads through a throttle valve 50 to the suction pipe 4. A direct connection between pressure and suction pipe is established by the pipe 51. An excess pressure valve 52 is inserted into this pipe and this consists of a cylindrical closing member 53 having a conical end 54 and sliding in a cylinder 55. This cylinder contains a closing spring 56 and is connected by means of an aperture 57 with the pipe 51.

The rotary valve 17 is rigidly held in the rotary valve 6 and is secured by non-illustrated resilient stops. It has a hand lever 58 at its outer end whilst the rotary valve 6 is provided with a hand lever 59.

If the rotary valves are in the position shown in Fig. 1 and the pump is supplying pressure fluid, the latter flows through the pressure pipe 2 and the groove 8 into the working pipe 24. At the same time it passes through the annular groove 7 and grooves 9 into the control pipe 45, and by a transverse pipe 35, into the valve chambers 27 and 37 and raises, by pressure on the pistons 31 and 41, the stop members 29 and 39.

Therefore the pressure fluid flows through the valve chamber 27 to the working cylinder 46 and raises the piston 47. The fluid displaced by the latter flows away through the working pipe 25, the valve chamber 37, groove 14, annular groove 13 and suction pipe 4. The working appliance is thus lowered.

If the rotary valve 6 is reversed by means of the hand lever 59 into the position as shown in Fig. 2, the control pipe 45 remains under pressure, namely, through the annular groove 7 and the groove 8. Through the same groove, the pressure fluid now flows into the working pipe 25, as the valves 26 and 36 are open due to pressure fluid introduced through control pipe 45; this pressure moves the piston 47 downwards and forces the displaced fluid through the working pipe 24, groove 14 and suction pipe 4 back to the tank.

In these operations the position of the rotary valve 17 is immaterial owing to its resilient stops, it is merely taken along by the rotary valve 6 as the latter rotates.

If the rotary valve 6 is in the position of rest as shown in Figs. 3 and 4, then the pressure pipe 2 is connected through the groove 10, the pipe 49 and the throttle valve 50 with the suction pipe 4. The fluid supplied circulates in this path in the pipes 2 and 49 under a pressure which depends only on the adjustment of the throttle valve 50. If the rotary valve 17 is in the position shown in Fig. 3, it connects the control pipe 45 through the bores 20 with the annular groove 13 and the suction pipe 4. The fluid in this pipe is not under pressure, therefore, the control pipe 45, the transverse pipe 35 and the cylinders 32 and 42 will also not be under pressure. The springs 33 and 43, therefore, press the locking bodies 29 and 39 on to the seats 28 and 38, the working pipes 24 and 25 are closed and the working piston 47, and together with it, the working appliance are held fixed in their positions.

If the rotary valve 17 is rotated into the position shown in Fig. 4 where the rotary valve 6 retains its position, it connects the bores 11 and 12 of the rotary valve by means of its groove 23. In this path fluid under the pressure governed by the throttle valve 50 now has access to the control pipe 45. This pressure is sufficient to raise the stop members 29 and 39; and accordingly their attached valves 26 and 36 are opened. The working pipes 24 and 25 are connected together by means of the grooves 15 and 16 and the annular grooves 13; therefore, the working appliance can move freely, carry along the piston 47 and push the fluid to and fro through the working pipes. In the position of rest of the rotary valve 6, it thus depends merely on the position of rotary valve 17 as to whether the valves 26 and 36 are open.

This applies, however, only while the pump is supplying pressure fluid; if, for example, it is not being driven, the valves 26 and 36 close and the working appliance is held firm.

The leakage fluid from the cylinders 32 and 42 passes through the oil leakage pipe 34 into the frontal space 21 and goes from there together with the leakage oil of the rotary valves through the longitudinal bore 18, the transverse bore 19 and the bores 20 to the suction pipe 4. If for any reason the pressure in the pressure pipe 2 should rise unduly in an unpredetermined manner, for example, if the working piston 47 has reached its end position, then the excess pressure valve 52 opens. Its closing member 53 is pressed to the right, the fluid flows past its end 54 to the suction pipe 4. The conical shape of the valve end 54 and the cylindrical shaft connected thereto prevent any excessive foaming of the oil.

In the cylinder 55 is a fluid which is displaced by the closing member 53 when said member opens. It can escape only through the comparatively narrow aperture 57, and even when the valve is closed, flows in again only slowly through this aperture. The movement of the closing body 53 is impeded so much thereby that it cannot oscillate.

The grooves and channels in the rotary valve and their casing may have other dispositions, they have been shown placed in one plane merely for reasons of more convenient illustrations. Similarly, the same method of operation may be realised with other control means, such as flat slide valves, which may then be correspondingly connected. All the valves and control means may be installed in a common casing in a small space, whilst it is also possible to dispose valves inside the rotary valves. It is advisable to dispose the axes of the stop valves perpendicular to the axes of the rotary valves, and the axes of the other valves with the appropriate pipes parallel to the axes of the rotary valves.

We claim:

1. A control device for hydraulic servo-motors, including in combination, a housing, a first control member, a second control member both in said housing, a suction pipe and a pressure pipe leading from said control members to a hydraulic pump, two working pipes connected to a working cylinder, means to connect said working pipes with said pressure pipe, stop valves in said working pipes, a control pipe connecting said working pipes with said control members, means operated by the first control member connecting in one operative position the pressure pipe with a working pipe and the pressure pipe with the control pipe, and in a second operative position the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

2. A control device for hydraulic servo-motors, including in combination, a housing, a first control member in said housing, a second control member in said housing, freely following said first control member, means to adjust the displacement of said second control member relatively to said first control member, a suction pipe and a pressure pipe leading from said control members to a hydraulic pump, two working pipes connected to a working cylinder, means to connect said working pipes with said pressure pipe, stop valves in said working pipes, a control pipe connecting said working pipes with said control members, means operated by the first control member connecting in one operative position the pressure pipe with a working pipe and the pressure pipe with the control pipe, and in a second operative position, the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

3. A control device for hydraulic servo-motors, including in combination, a housing, a first control member, a second control member, means to rotate said control members about an axis in said housing, a suction pipe and a pressure pipe leading from said control members to a hydraulic pump, two working pipes connected to a working cylinder, means to connect said working pipes with said pressure pipe, stop valves in said working pipes, a control pipe connecting said working pipes with said control members, means operated by the first control member connecting in one operative position the pressure pipe with a working pipe and the pressure pipe with the control pipe, and in a second operative position the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

4. A control device for hydraulic servo-motors, including in combination, a housing, a first rotary valve element in said housing, a second rotary valve element therein, a suction pipe and a pressure pipe leading from said rotary valve elements to a hydraulic pump, two working pipes connected to a working cylinder, means to connect said working pipes with said pressure pipe, stop valves in said working pipes, a control pipe connecting said working pipes with said rotary valve elements, means operated by the first control member connecting in one operative position the pressure pipe with a working pipe and the pressure pipe with the control pipe, and in a second operative position, the pressure pipe to the second working pipe and the pressure pipe to the control pipe, means to connect the other working pipe in each of said operative positions with the suction pipe in which positions said second control member is inoperative, means in the position of rest to effect by the first rotary valve element a connection between the pressure and suction pipes through a by-pass, in addition to a connection between the two working pipes, and means in the position of rest to effect by the second rotary valve element a connection of the control pipe with either the suction or pressure pipe.

5. A control device for hydraulic servomotors, including in combination, a housing, a first control member, a second control member both in said housing, a suction pipe and a pressure pipe leading from said control members to a hydraulic pump, an overflow valve between said suction and pressure pipes, two working pipes connected to a working cylinder, means to connect said working pipes with said pressure pipe, stop valves in said working pipes, a control pipe connecting said working pipes with said control members, means operated by the first control member connecting in one operative position the pressure pipe with a working pipe and the pressure pipe with the control pipe, and in a second operative position the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

6. A control device for hydraulic servomotors, including in combination, a housing, a first control member, a second control member both in said housing, a suction pipe and a pressure pipe leading from said control members to a hydraulic pump, an overflow valve between said suction and pressure pipes and disposed in said housing, two working pipes connected to a working cylinder, means to connect said working pipes with said pressure pipe, stop valves in said working pipes, a control pipe connecting said working pipes with said control members, means operated by the first control member connecting in one operative position the pressure pipe with a working pipe and the pressure pipe with the control pipe, and in a second operative position, the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

7. A control device for hydraulic servomotors, including in combination, a housing, a first control member, a second control member both in said housing, a suction pipe and a pressure pipe leading from said control members to a hydraulic pump, an overflow valve between said suction and pressure pipes and disposed in one of said control members, two working pipes connected to a working cylinder, means to connect said working pipes with said pressure pipe, stop valves in said working pipes, a control pipe connecting said working pipes with said control member, means operated by the first control member connecting in one operative position the pressure pipe with a working pipe and the pressure pipe with the control pipe, and in a second operative position the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

8. A control device for hydraulic servomotors, including in combination, a first control member, a second control member, a suction pipe and a pressure pipe leading from said control members to a hydraulic pump, an overflow valve between said suction and pressure pipes, a cylinder containing said valve, and a pipe of small bore connecting said cylinder with a fluid space, two working pipes connected to a working cylinder, means to connect said working pipes with said pressure pipe, stop valves in said working pipes, a control pipe connecting said working pipes with said control members, means operated by the first control member connecting in one operative position the pressure pipe with a working pipe and the pressure pipe with the control pipe, and in a second operative position, the pressure pipe to the second working pipe and the pressure pipe to the control pipe, means to connect the other working pipe in each of said operative positions with the suction pipe in which positions said second control member is inoperative, means in the position of rest to effect by the first control member a connection between the pressure and suction pipes through a by-pass, in addition to a connection between the two working pipes, and means in the position of rest to effect by the second control member a connection of the control pipe with either the suction or pressure pipe.

9. A control device for hydraulic servomotors, including in combination, a housing, a first rotary valve element, a second rotary valve element both in said housing, a suction pipe and a pressure pipe leading from said rotary valve element to a hydraulic pump, two working pipes connected to a working cylinder, means to connect said working pipes with said pressure pipe, stop valves in said working pipes, with their axes at right angles to the axes of said rotary valves, a control pipe connecting said working pipes with said rotary valve elements, means operated by the first control member connecting in one operative position the pressure pipe with a working pipe and the pressure pipe with the control pipe, and in a second operative position, the pressure pipe to the second working pipe and the pressure pipe to the control pipe, means to connect the other working pipe in each of said operative positions with the suction pipe and with the second rotary valve element, means in the position of rest to effect by the first rotary valve element a connection between the pressure and suction pipes through a by-pass, in addition to a connection between the two working pipes, and means in the position of rest to effect by the second rotary valve element a connection of the control pipe with either the suction or pressure pipe.

10. A control device for hydraulic servo-motors, comprising, in combination, a first control member; a second control member; a suction conduit means and a pressure conduit means adapted to connect said control members to a hydraulic pump; two working conduit means adapted to be connected to a working cylinder; means to connect said working conduit means with said pressure conduit means; stop valves in said working conduit means, a control conduit means connecting said working conduit means with said control members; means operated by said first control member and connecting in one operative position said pressure conduit means with one of said working conduit means and with said control conduit means, and connecting in a second operative position said pressure conduit means with the other working conduit means and with said control conduit means; means to connect the other of said working conduit means in each of said operative positions with said suction conduit means, in which positions said second control member is inoperative; means in the position of rest to effect by said first control member a connection between said pressure conduit means and said suction conduit means through a by-pass, in addition to a connection between said two working conduit means; and means in the position of rest to effect by said second control member a connection of said control conduit means with either said suction conduit means or said pressure conduit means.

11. A control device for hydraulic servo-motors, comprising, in combination, a first control member; a second control member; a suction conduit means and a pressure conduit means adapted to connect said control members to a hydraulic pump; two working conduit means adapted to be connected to a working cylinder; means to connect said working conduit means with said pressure conduit means; stop valves in said working conduit means; a control conduit means connecting said working conduit means with said control members; means operated by said first control member for connecting said pressure conduit means with said control conduit means and selectively with said working conduit means; means to connect one of said working conduit means with said suction conduit means; means for effecting by said first control member a connection between said pressure conduit means and said suction conduit means; and means to effect by said second control member a connection of said control conduit means with either said suction conduit means or said pressure conduit means.

References Cited in the file of this patent
UNITED STATES PATENTS

| | | |
|---|---|---|
| 1,590,226 | Boisset | June 29, 1926 |
| 2,467,509 | Trautman | Apr. 19, 1949 |
| 2,524,055 | Hubert | Oct. 3, 1950 |
| 2,558,960 | Johnson | July 3, 1951 |
| 2,618,121 | Tucker | Nov. 18, 1952 |